Dec. 11, 1928.
P. P. DEAN
VALVE
Filed April 27, 1927    2 Sheets-Sheet 1
1,694,809
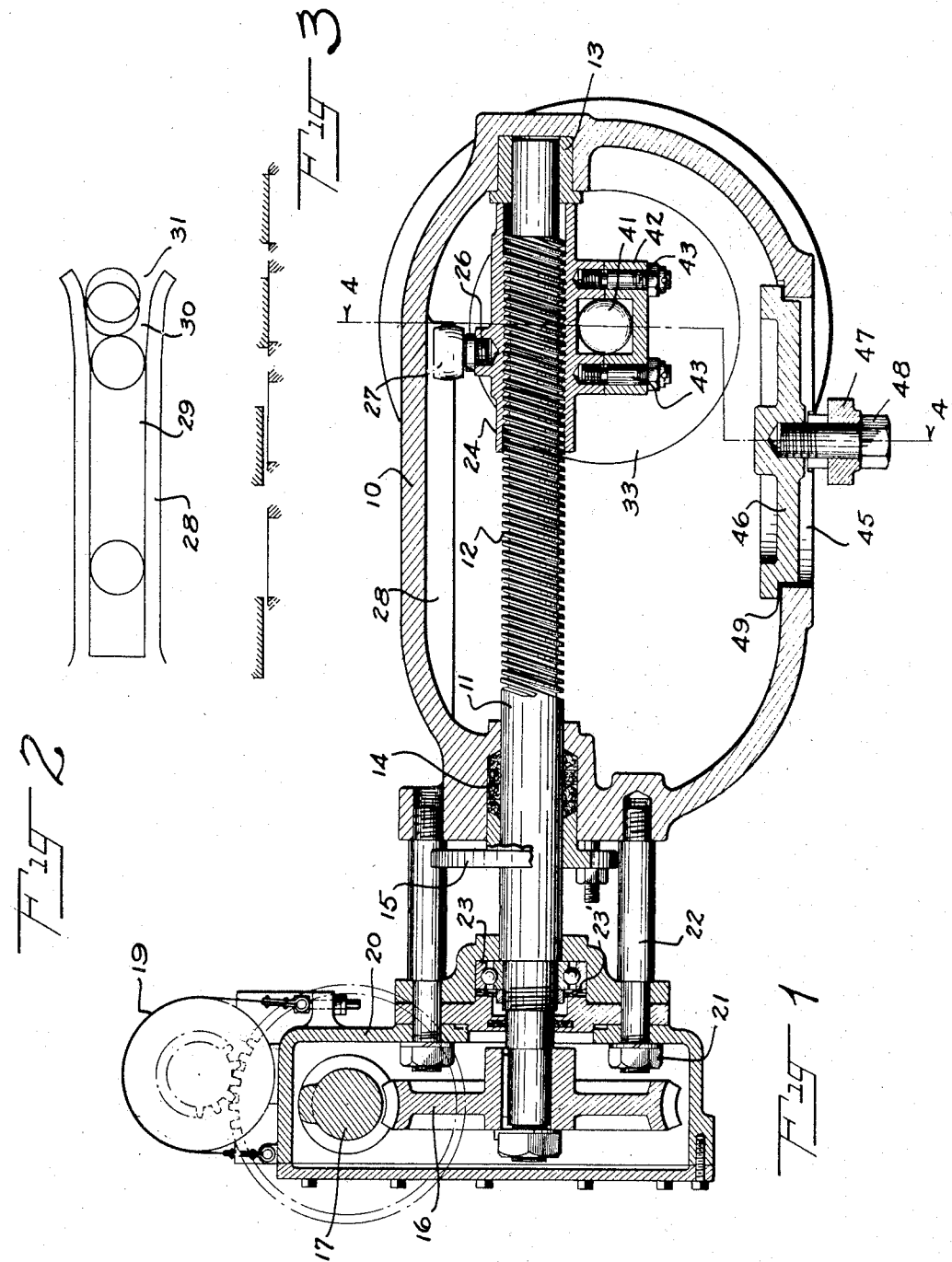
INVENTOR.
Peter Payne Dean
BY
ATTORNEY

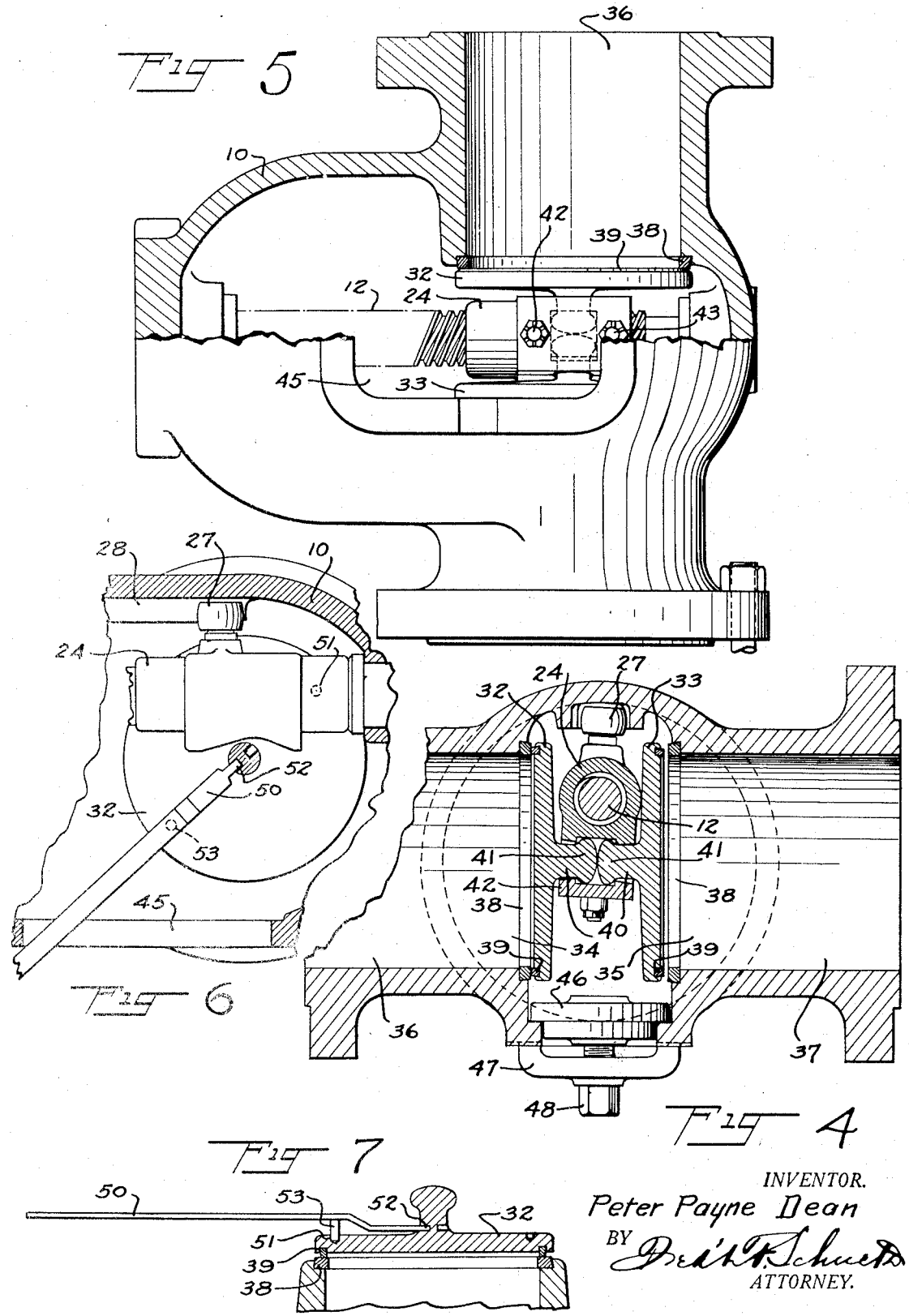

Patented Dec. 11, 1928.

1,694,809

UNITED STATES PATENT OFFICE.

PETER PAYNE DEAN, OF NEW CANAAN, CONNECTICUT.

VALVE.

Application filed April 27, 1927. Serial No. 187,018.

The invention relates to valves for controlling the flow of fluids, and is especially adapted for the control of fluids under relatively high pressures. It has reference more particularly to the gate type of valve in which a disk member is caused to slide or reciprocate over an opening to cut off therefrom or to permit the flow therethrough of a fluid. In valves of this type, it has been customary to carry the valve disk or flow-controlling element on a spindle which is screwed into and out of the valve body to move accordingly the said disk; and it is one of the objects of the present invention to obviate the necessity for such rising or lowering spindle projecting externally of the body of the valve mechanism, and thereby materially reduce the required height of the valve and free space or head room necessary to accommodate movement of the actuating spindle.

A further object of the invention resides in a novel combination of valve disks and actuating means therefor, whereby it becomes possible to entirely confine the same within the surrounding valve body, the actuating spindle being designed for rotation, but not rising and lowering as in the well-known rising screw and yoke type. A still further object of the invention resides in the eccentric mounting, in the valve body, of the actuating spindle or drive shaft for the valve disk to provide a fulcrum for a movable nut whereby the seating of said disk is accomplished.

Another object of the invention resides in the provision of means for maintaining a valve disk always in alignment with its coacting seat; also in the provision of means for retaining the valve disk and its seat separated, regardless of the flow, until said valve disk is about in position to shut off the flow at its cooperating seat; and, furthermore, in the arrangement whereby the seating of one of a pair of valve disks is positively insured entirely by the pressure of the fluid prevailing in the valve body.

A still further object of the invention is to afford a construction of valve which will admit of the grinding or lapping of the seating surfaces in situ, that is to say, without neces- sitating the removal of the valve from the line, said operation being effected from the exterior of the valve in a simple and effective manner.

The novel construction provides, furthermore, for the ready and convenient removal of a valve disk through a hand hole of the valve body should it become necessary, for example, to replace a valve disk; and contemplates withal a valve of simple and rugged construction, of few parts, and one in which it is impossible to wedge the closure element so tightly into its seat or the like as to cause jamming.

To this end, the invention comprises, generally, a rotatable screw shaft mounted in the valve body and working through a nut member to reciprocate the latter which carries also a pair of valve disks connected thereto in such a manner as to afford the said disks freedom of movement with respect to said nut. The latter is further controlled by guiding means therefor to permit a disk to swing freely toward its seat shortly before it reaches its position for complete closure, the said disk at other times being maintained through the action of said guide out of contact with its seat, whereby excessive sliding contact substantially throughout its travel is eliminated and the tendency to score the sealing surfaces reduced to a minimum.

The nature of the invention, however, will best be understood when described in connection with the accompanying drawings, in which:

Fig. 1 is a longitudinal section through the valve.

Fig. 2 is a fragmentary underneath view of the guiding means with guide roller operating therein indicated in various positions along the guide.

Fig. 3 is a diagrammatic view illustrating the relative positions of valve and valve seat corresponding to the respective positions of the rollers as shown in Fig. 2.

Fig. 4 is a transverse vertical section taken on the line 4—4, Fig. 1, and looking in the direction of the arrows.

Fig. 5 is an underneath view of the valve body with a portion of the casing broken away to disclose the interior.

Fig. 6 is a fragmentary plan view of a valve disk and associated parts for effecting a grinding of a valve seat; and Fig. 7 is a similar sectional view.

Referring to the drawings, 10 designates the valve body or casing affording a chamber within which is mounted for rotation, and eccentrically of said chamber, a longitudinally disposed actuating shaft or spindle 11 having a square-threaded portion 12. The one end of this shaft is supported in a bearing 13 of the casing; while its other end projects beyond said casing, passing through suitable packing 14 thereof and a follower gland 15. At its extreme outer end, said spindle carries a worm wheel 16 by which it may be rotated in either direction through engagement of the said worm wheel with a worm 17, the latter being manually actuated by a hand wheel (not shown) or motor driven by means of an electric motor 19 geared thereto. The said worm wheel and worm are mounted within a casing 20 securely held to the valve body or casing by nuts 21 working on the outer ends of a plurality of shouldered bolts 22 firmly screwed to said valve body, said worm and worm wheel casing supporting also the said motor 19, and a ball bearing 23 being held rigidly thereto for rotatably supporting the said actuating spindle or shaft 11. A spring steel disk washer 23' therein serves to absorb the shock of too violent contact caused by the outer end of a nut member 24 on shaft 11 with its corresponding end abutment, as well as to prevent jamming caused by rocking of a valve disk to turn the attached nut member and consequently imparting a longitudinal or axial component thereto. It will thus be understood that as the worm shaft 17 is rotated, manually or by power, in either direction, shaft 12 will be rotated accordingly.

There is designed to move over the latter shaft the coacting elongated nut member 24 from which extends outwardly a stud 26, the latter carrying also a guide roller 27 reciprocable in a guiding channel 28 cast upon the inner surface of the adjacent wall of the casing. This channel is of uniform width, equal substantially to the diameter of the roller 27, for the portion 29, then increasing gradually in width over the portion 30 until at the portion 31 the roller is perfectly free to move laterally in either direction.

The nut member 24 carries also and at its side opposite the guide roller 27 a pair of valve disks 32 and 33 which are designed to slide over respective valve ports 34 and 35 of the oppositely disposed fluid ducts 36 and 37 of the valve. Metallic seat rings 38 are provided at the said ports to coact with similar rings 39 of the faces of said valve disks; and each disk, furthermore, carries an axial projection 40 extending from its outer surface and terminating in a rounded head 41. The two said rounded heads of the valve disks are, moreover, held to the nut member 24 as by a cap member 42 through bolts 43; but in such a manner that they form a ball and socket connection therewith and thus are free to rock therein, so that a disk member may partake of a slight oscillation if displaced from its corresponding seat, whereby the seat rings will always remain aligned. Furthermore, the nut member may rock as a whole freely on its threaded shaft 11 when the roller is located in the portion 31 of the channel 28.

The method of operation of the valve is as follows: Assuming the valve to be in the full open position, guide roller 27 will be in the portion 29 of the guide channel. As this guide roller moves along said channel in accordance with the movement of its carrying nut 24 under the rotation of shaft 11, it will eventually reach the position represented by the portion 30 of the channel, said valve disks having been maintained up to this point out of contact with their respective seats. However, as the roller reaches the somewhat widened portion of the guideway, it is free to be displaced laterally depending upon the direction of flow of the fluid, the nut 24 oscillating on its shaft as a fulcrum to permit of this movement. Continued movement of the nut brings the roller further along the guideway, said roller maintaining contact with one of the curved wall portions thereof until said slot widens out sufficiently as at the portion 31 to cause the roller to break contact entirely with a wall of the guide channel and thus enable a corresponding disk to come into firm contact with its seat under the force applied as a result of the pressure prevailing in the valve chamber.

Due to the provision of said guide channel and roller operating therein, a disk does not come into contact with its seat until the said guide roller moves from the portion 29 to a point intermediate the portions 30 and 31; and said disk and its seat remain in partial contact until the latter portion is reached at which stage one of the disks completely covers its port while the other disk is away from its corresponding port, as indicated in Fig. 4 of the drawings. Fig. 3 of the drawings illustrates diagrammatically the relative positions of a valve disk and its corresponding seat in relation to the positions of a guide roller in the guide channel. By the foregoing expedient, excessive sliding contact is obviated throughout the complete travel and a minimum tendency to score the sealing surfaces is attained.

In opening the valve with operating fluid pressure on one side of the disk and atmospheric pressure on the other, shaft 11 is rotated as by means of the motor 19 in the reverse direction, that is to say, to bring the guide roller back into the restricted portion of the guide channel, the valve disk sliding over its seat to a point where sufficient opening of the port is created, to allow a flow of fluid therethrough sufficient to balance the pressure on both sides of the disc, thus enabling the disc to be gradually separated entirely from the seat, so that the remaining motion of the valve disc is accomplished with little effort.

A most important and particularly novel feature lies in the shape of the walls of the guide channel at the portion 30 to 31 enabling a sliding movement of the disc to take place first, this being necessary to balance the pressure of the fluid and thus relieve the excessive pressure on the back face of the disc before it is possible to cause separation of disc and seat. The roller, in combination with the shape of the guide channel, minimizes friction and allows the valve to be opened and closed against extreme velocities with a minimum of power.

The valve herein described admits, also, of the grinding of the contact surfaces or rings 38 and 39 thereof without necessitating the dismantling of the valve, it being possible to effect such grinding with the valve remaining in the line. For example, access may be had to the interior of the valve and the disks thereof through a handhole 45 provided in the valve body and normally closed by a cover member 46 through clamp 47 and bolt 48 and an intermediate sealing gasket 49. When grinding is to be effected, the valve disks are brought into position, through rotation of shaft 11, to a point where a corresponding disk completely closes its port; and a grinding lever 50 is then inserted into two openings or recesses—one of which, as the opening 51, being of a series of openings provided in the disk and circularly disposed in the back thereof, while the other, as the opening 52, is in the axial projection 40 of a disk. The respective openings lie in corresponding radii of a disk; and the lever 50 is squared and reduced at its outer end to fit an opening 52 and has a tooth or projection 53 extending from its under side to fit into an opening 51, so that a disk thus attached to the lever may be oscillated by the latter until perfect fitting seats are obtained, said disk being free to oscillate through the mounting of its rounded head 41.

If it should be necessary to replace a disk, the same may readily be removed through the handhole opening aforesaid, merely by removing the two bolts 43 and the cap member 42, the disk having been brought to a point substantially opposite the axis of said opening through corresponding rotation of the shaft 11; and in which position, also, it will be out of contact with its respective seat.

I claim:

1. A valve, comprising a casing forming a valve chamber having valve ports and valve disks cooperating therewith, an actuating member movable in the casing, a nut connected with the valve disks, oscillatable on the actuating member to permit a disk to seal its port, and means to guide and control the extent of oscillation of said nut.

2. A valve, comprising a casing forming a valve chamber having valve ports and valve disks cooperating therewith, a shaft rotatably mounted therein having a threaded portion, a nut connected with the valve disks, working on said shaft and oscillatable thereon to permit a disk to seal its port, and means to guide and control the extent of oscillation of said nut.

3. A valve, comprising a casing forming a valve chamber having valve ports and valve disks cooperating therewith, a shaft rotatably mounted therein having a threaded portion, a nut connected with the valve disks, working on said shaft and oscillatable thereon to permit a disk to seal its port, and a guide roller carried by said nut and working in a channel of the casing.

4. A valve, comprising a casing forming a valve chamber having valve ports and valve disks cooperating therewith, a shaft rotatably mounted therein having a threaded portion, a nut connected with the valve disks, working on said shaft and oscillatable thereon to permit a disk to seal its port, and a single guide roller carried by said nut and working in a channel of the casing, said channel being of different widths along its length to correspondingly restrict the lateral movement of the said guide roller therein.

5. A valve, comprising a casing forming a valve chamber having valve ports and valve disks cooperating therewith, a shaft rotatably mounted therein having a threaded portion, a nut connected with the valve disks, working on said shaft and oscillatable thereon to permit a disk to seal its port, and a single guide roller carried by said nut and working in a channel of the casing, said channel having for a predetermined length a width equal substantially to the diameter of the roller, then increasing in width in accordance with the desired oscillation of the valve disk.

6. A valve, comprising a casing forming a valve chamber having valve ports and a pair of valve disks cooperating therewith, a shaft rotatably mounted in said valve chamber and eccentrically with respect to the axis of the pair of valve disks, and a nut connected with the valve disks, working on said shaft and oscillatable thereon to permit a disk to seal its port.

7. A valve, comprising a casing forming a valve chamber having valve ports and a pair of valve disks cooperating therewith, a shaft rotatably mounted in said valve chamber and eccentrically with respect to the axis of the pair of valve disks, and a nut having a universal connection with the valve disks, working on said shaft and oscillatable thereon to permit a disk to seal its port.

8. A valve, comprising a casing forming a valve chamber having valve ports and a pair of valve disks cooperating therewith, a shaft rotatably mounted in said valve chamber and eccentrically with respect to the axis of the pair of valve disks, a nut working on said shaft, and universal and removable means connecting the nut with the valve disks.

In testimony whereof I affix my signature.

PETER PAYNE DEAN.